United States Patent
Mifune et al.

(10) Patent No.: US 8,810,868 B2
(45) Date of Patent: Aug. 19, 2014

(54) MARK DETECTION APPARATUS AND METHOD FOR DETECTING MARK

(75) Inventors: Eiji Mifune, Osaka (JP); Shunji Miki, Osaka (JP); Koji Habata, Osaka (JP); Osamu Mine, Osaka (JP); Takeshi Sakaguchi, Osaka (JP); Mari Kurimoto, Osaka (JP); Hiroyuki Kurita, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/590,878

(22) Filed: Aug. 21, 2012

(65) Prior Publication Data

US 2013/0050777 A1 Feb. 28, 2013

(30) Foreign Application Priority Data

Aug. 24, 2011 (JP) .................................. 2011-183173

(51) Int. Cl.
*H04N 1/04* (2006.01)

(52) U.S. Cl.
USPC ......................................... 358/474; 358/3.26

(58) Field of Classification Search
USPC ............................................... 358/474, 3.26
See application file for complete search history.

(56) References Cited

FOREIGN PATENT DOCUMENTS

| JP | 62-127982 A | 6/1987 |
|---|---|---|
| JP | 06-215206 A | 8/1994 |
| JP | 2002-354212 A | 12/2002 |
| JP | 2005-115907 A | 4/2005 |

OTHER PUBLICATIONS

Office Action mailed Nov. 26, 2013 in corresponding Japanese application No. 2011-183173.
Notice of Reasons for Rejection issued to JP Application No. 2011-183173 mailed Mar. 11, 2014.

*Primary Examiner* — Benny Q Tieu
*Assistant Examiner* — Martin Mushambo
(74) *Attorney, Agent, or Firm* — Knobbe Martens Olson & Bear LLP

(57) ABSTRACT

A mark detection apparatus includes a reading unit, a converter, and a determination part. The reading unit reads an image on a document. The converter compares respective portions of the image read by the reading unit with a plurality of preset reference patterns, and converts a portion of the image to a character associated with a corresponding reference pattern. The determination part determines that the portion of the image to have been compared on the document is a mark in a case in which the character converted by the converter is a preset first reference character, and that the portion of the image to have been compared on the document is not a mark in a case in which the character converted by the converter is not a preset first reference character.

2 Claims, 12 Drawing Sheets

FIG. 6

|    | 1 | 2 | 3  | 4 | 5 |
|----|---|---|----|---|---|
| Q1 | 0 | 1 | 9  | 5 | 0 |
| Q2 | 0 | 2 | 8  | 4 | 1 |
| Q3 | 0 | 0 | 10 | 5 | 0 |
| Q4 | 0 | 1 | 9  | 4 | 0 |
| ⋮  |   | ⋮ |    |   |   |

FIG. 7A

| DOCUMENT NO. | Q1 | Q2 | Q3 | Q4 |
|---|---|---|---|---|
| 1 | □□■□□ | □□■□□ | □□□■□ | □□〆□□ |
| 2 | □□■□□ | □□盛□□ | □□□廬□ | □□□■□ |
| 3 | □□■□□ | □□■□□ | □□■□□ | □□■□□ |
| 4 | □□□■□ | □□■□□ | □□■□□ | □□■□□ |
| 5 | □□固□□ | □□階□□ | □□留□□ | □□匪□□ |
| 6 | □□□围□ | □□□甫□ | □□岡□□ | □□□吻□ |
| 7 | □□□■□ | □□□■□ | □□■□□ | □□■□□ |
| 8 | □□■□□ | □□圏□□ | □□■□□ | □□■□□ |
| 9 | □□■□□ | □■□□□ | □□●□□ | □□■□□ |
| 10 | □□爬□□ | □□吻□□ | □□脇□□ | □□■□□ |
| 11 | □□□ゴ□ | □□□■□ | □□齒□□ | □□□■□ |
| 12 | □□□■□ | □□□□■ | □□□■□ | □□□■□ |
| 13 | □□■□□ | □□□曽□ | □□□回□ | □□■□□ |
| 14 | □□■□□ | □□■□□ | □□■□□ | □□■□□ |
| 15 | □啣□□□ | □翻□□□ | □□□寧□ | □■□□□ |

FIG. 7B

EQUATION:

=IF(ISERR(SEARCH(MID(Q1,1,1),"□u ㄩ□□□ ",1)),1,IF(ISERR(SEARCH(MID (Q1,2,1),"□u ㄩ□□□",1)),2,IF(IF(ISERR (SEARCH(MID(Q1,3,1),"□uㄩ□□□", 1)),3,IF(ISERR(SEACH(MID(Q 1,4,4),"□u ㄩ□□□",1)),4IF(ISERR (SEARCH(MID(Q1,5,1),"□u ㄩ□□□", 1)),5)))))

FIG. 7C    COLUMN OF COUNTED VALUES

| DOCUMENT NO. | 1. SATISFACTION LEVEL | 2. UNDERSTANDING LEVEL | 3. USEFULNESS LEVEL | 4. ORGANIZATIONAL ASPECT |
|---|---|---|---|---|
| 1 | 3 | 3 | 4 | 3 |
| 2 | 3 | 3 | 4 | 4 |
| 3 | 3 | 3 | 3 | 3 |
| 4 | 4 | 3 | 3 | 3 |
| 5 | 3 | 3 | 3 | 3 |
| 6 | 4 | 4 | 3 | 4 |
| 7 | 4 | 4 | 3 | 3 |
| 8 | 3 | 3 | 3 | 3 |
| 9 | 3 | 2 | 3 | 3 |
| 10 | 3 | 3 | 3 | 3 |
| 11 | 4 | 4 | 3 | 4 |
| 12 | 4 | 5 | 4 | 4 |
| 13 | 3 | 4 | 4 | 3 |
| 14 | 3 | 3 | 3 | 3 |
| 15 | 2 | 2 | 4 | 2 |

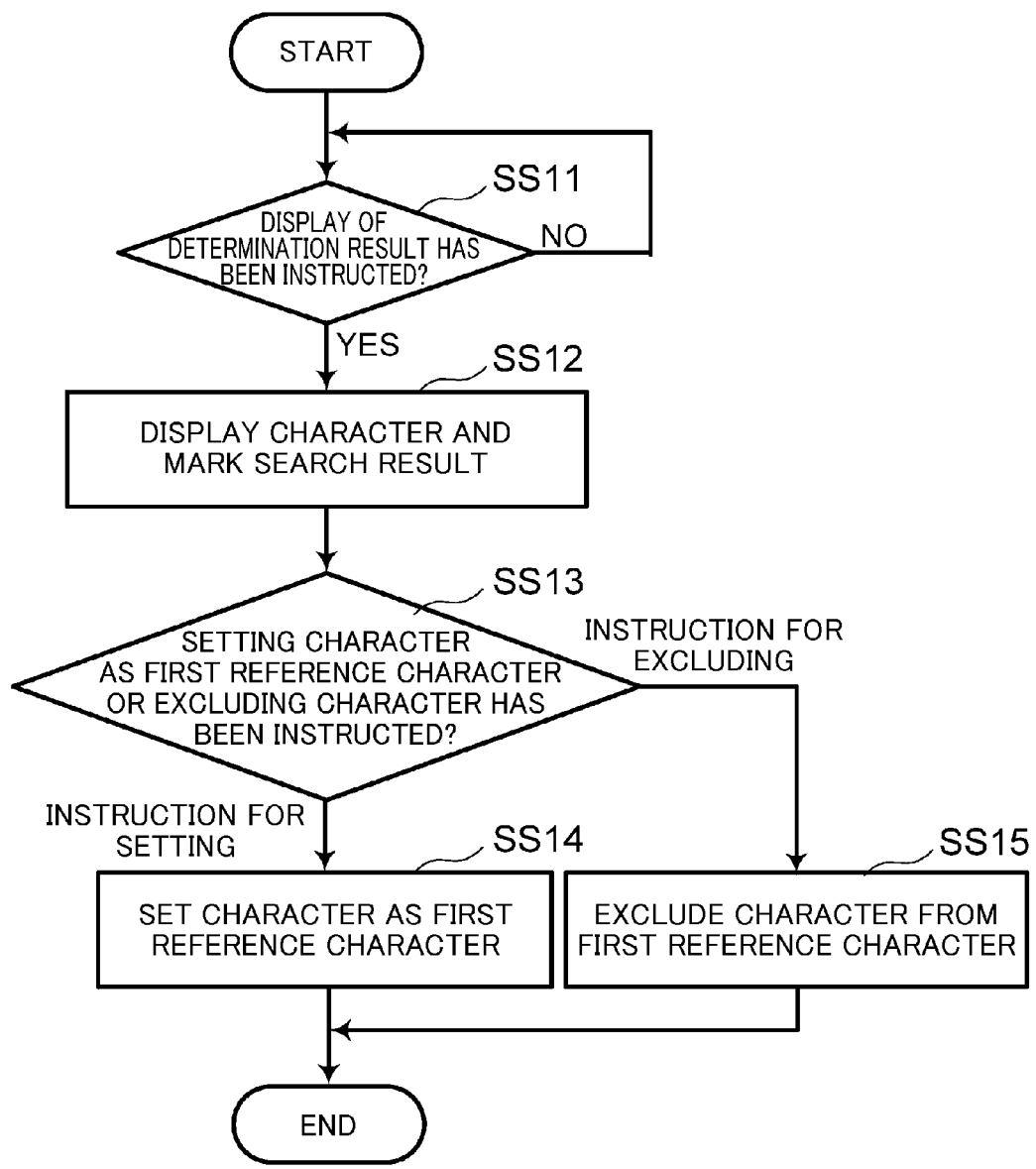

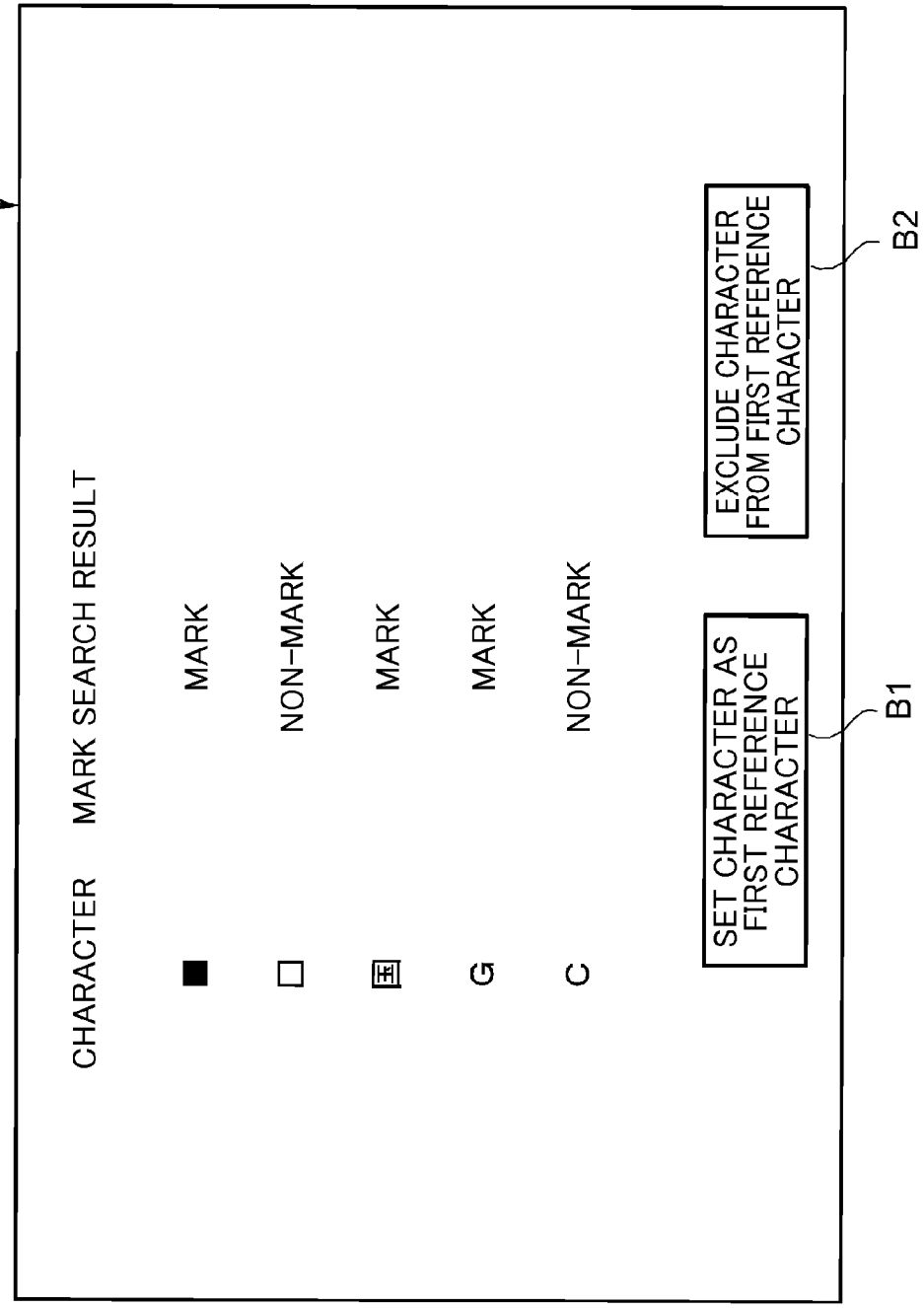

MARK DETECTION APPARATUS AND METHOD FOR DETECTING MARK

INCORPORATION BY REFERENCE

This application is based on and claims the benefit of priority from Japanese Patent Application No. 2011-183173, filed on 24 Aug. 2011, the content of which is incorporated herein by reference.

BACKGROUND

The present disclosure relates to a mark detection apparatus and a method for detecting a mark, especially to a technique of detecting a mark on a document, based on data obtained by reading the document.

Conventionally, an Optical Mark Reading (OMR) apparatus has been known as an apparatus for reading marks marked on a special document such as a bubble sheet. The OMR apparatus detects presence of a mark on the document based on light emitted to a surface of the document and reflected from it. In addition, as a technique of scanning a bubble sheet using an image forming apparatus, a technique has been known, which reduces the time necessary for scanning the bubble sheet by setting a resolution appropriate for the bubble sheet.

In order to detect the presence of a mark (whether it is a mark or not) on a document such as a bubble sheet, the OMR apparatus described above is required. Therefore, it is necessary for a user to purchase an OMR apparatus for detection of a mark. However, the purchase of an OMR apparatus will result in a cost burden for the user. Accordingly, it is desirable to provide a way to help ease the cost burden. In addition, it is desirable to further improve the accuracy of reading a mark in the technique of scanning a bubble sheet performed by an image forming apparatus.

The present disclosure provides a mark detection apparatus and a method for detecting a mark that allow highly accurate detection of a mark on a document such as a bubble sheet, with reduced costs.

SUMMARY

A mark detection apparatus according to a first aspect of the present disclosure includes a reading unit, a converter, and a determination part.

The reading unit reads an image on a document. The converter compares respective portions of the image read by the reading unit with a plurality of preset reference patterns, and converts a portion of the image to a character associated with a corresponding reference pattern. The determination part determines that the portion of the image to have been compared on the document is a mark in a case in which the character converted by the converter is a preset first reference character, and that the portion of the image to have been compared on the document is not a mark in a case in which the character converted by the converter is not a preset first reference character.

A method for detecting a mark according to another aspect of the present disclosure includes a reading step, a conversion step, and a determination step. In the reading step, an image on a document is read. In the conversion step, comparison is performed between respective portions of the image read in the reading step with a plurality of preset reference patterns, and a portion of the image is converted to a character associated with a corresponding reference pattern. In the determination step, it is determined that the portion of the image to have been compared on the document is a mark in a case in which the character converted in the conversion step is a preset first reference character, and that the portion of the image to have been compared on the document is not a mark in a case in which the character converted in the conversion step is not a preset first reference character.

BRIEF DESCRIPTION OF DRAWINGS

FIG. 6 is a diagram illustrating an example of counting data;

FIG. 7A is a diagram virtually illustrating a group of characters converted by a converter;

FIG. 7B is a diagram showing an example of an equation;

FIG. 7C is a diagram showing an example of a column of counted values;

FIG. 8 is a flow chart showing a process for updating a first reference character;

FIG. 9 is a diagram illustrating an example of a screen of a display in a client computer;

DETAILED DESCRIPTION

An image reading device and a computer as a mark detection apparatus according to an embodiment of the present disclosure will be described hereinafter with reference to the drawings.

Figure 1:
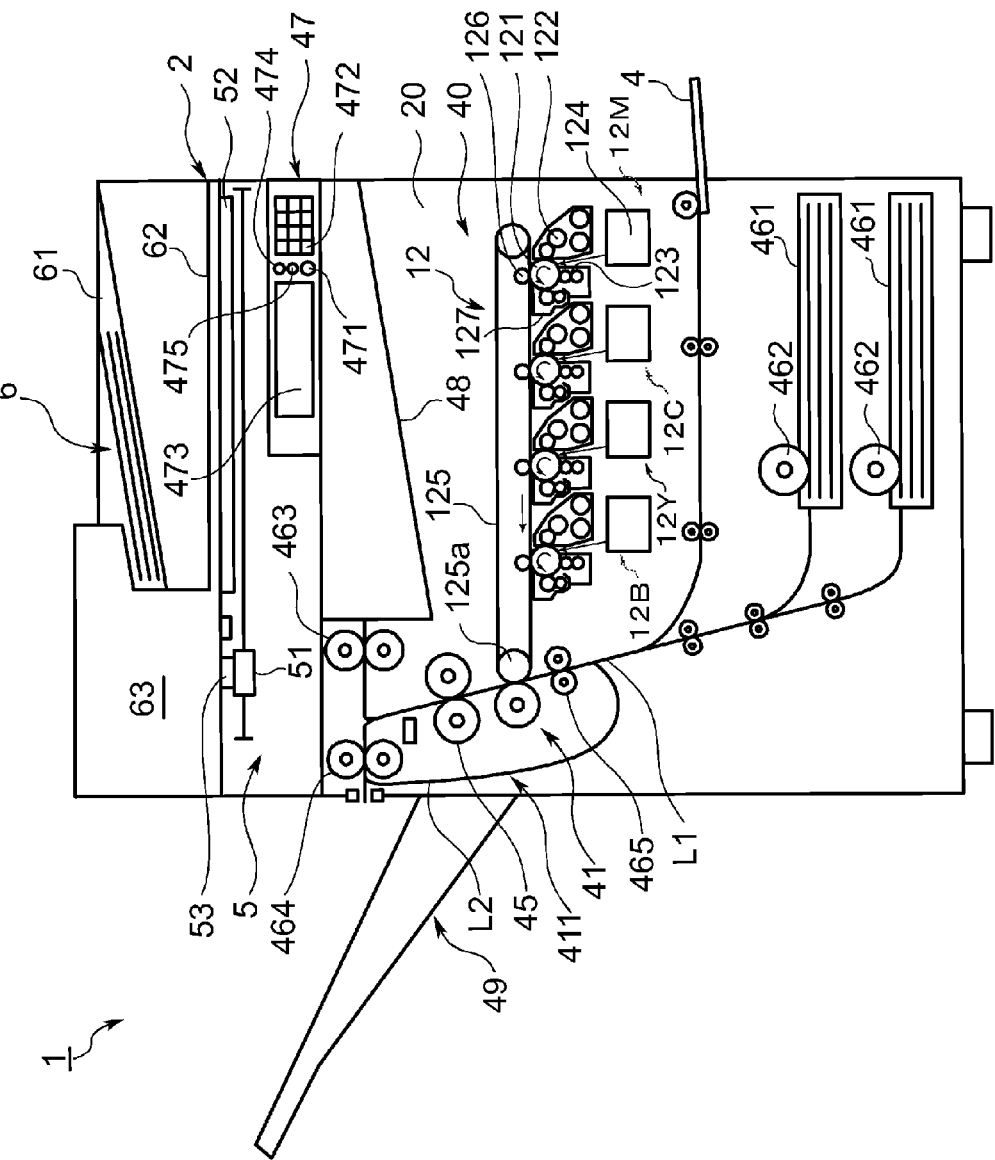
FIG. 1 is a cross-sectional view illustrating a mechanical configuration of a multifunction peripheral as an image reading device constituting a part of a mark detection apparatus.

The mark detection apparatus according to the embodiment of the present disclosure includes a part of an image reading device and a part of a computer. FIG. 1 is a cross-sectional view illustrating a mechanical configuration of a multifunction peripheral as an image reading device constituting a part of the mark detection apparatus. A multifunction peripheral 1 is provided with a plurality of functions including a copy function, a printing function, a scanning function, a facsimile function and the like. The multifunction peripheral 1 includes an apparatus main body 2 and a feeding device (not illustrated) provided on a side portion (left in FIG. 1) of the apparatus main body 2. The apparatus main body 2 includes a main body portion 20, a manual feeding tray 4, a document reading unit (reading unit) 5 provided at an upper portion of the apparatus main body 2, and a document feeding unit 6 (not essential for reading unit) provided above the document reading unit 5.

In addition, an operation unit 47 is provided at a front portion of the multifunction peripheral 1. The operation unit 47 is provided with a START key 471, numerical keys 472, a display 473, a RESET key 474, a STOP key 475 and the like.

The display 473 displays the information on operation guidance and the like relating to the abovementioned functions of the multifunction peripheral 1. The display 473 may be, for example, a Liquid Crystal Display (LCD). The display 473 has a touch screen function allowing a user to input various settings required for using the functions of the multifunction peripheral 1.

The START key 471 is a key allowing the user to input a printing execution instruction. The numerical keys 472 are configured to allow the user to input a numerical value such as the number of copies. The RESET key 474 is configured to allow the user to reset setting made on the display 473. The STOP key 475 is configured to allow the user to stop a printing operation in progress.

The document reading unit 5 includes a scanner 51, a platen 52, and a document reading slit 53. The scanner 51 is composed of a Charge Coupled Device (CCD), an image irradiation lamp, and the like. The platen 52 is composed of a transparent member such as a glass plate.

The scanner 51 is configured to be movable driven by a driving unit (not illustrated). When scanning is performed for a document placed on the platen 52, the scanner 51 moves along a document surface at a position facing the platen 52. While the scanner 51 is scanning the document surface, it outputs image data obtained from the document to a main controller 100 to be described later.

When the scanner 51 reads a document fed by the document feeding unit 6, the scanner 51 moves to a position facing the document reading slit 53. The scanner 51 reads image data of the document through the document reading slit 53, while the scanner 51 is in synchronization with the document feeding operation performed by the document feeding unit 6. The scanner 51 outputs the image data of the document thus read to the main controller 100.

The document feeding unit 6 includes a document mount 61 on which a document is placed, a document discharging unit 62 to which the document is discharged after image reading, and a document conveying mechanism 63. The document conveying mechanism 63 includes a paper feeding roller (not illustrated), a conveyance roller (not illustrated), and a paper reversing mechanism (not illustrated). The document conveying mechanism 63 causes a document placed on the document mount 61 to be fed one by one and to be conveyed to a position facing the document reading slit 53 driven by the paper feeding roller and the conveyance roller. After the scanner 51 scans an image of the document through the document reading slit 53, the document conveying mechanism 63 discharges the document to the document discharging unit 62. With the paper reversing mechanism turning a document upside down and conveying it again to the position facing the document reading slit 53, the document conveying mechanism 63 allows the scanner 51 to scan images of both faces of the document through the document reading slit 53.

The document feeding unit 6 is rotatably attached to the apparatus main body 2, such that a front side of the document feeding unit 6 is movable upward. When the front side of the document feeding unit 6 is moved upward to cause an upper face of the platen 52 to be open, it is possible for the user to place a document to be read (for example, an opened book) onto the upper face of the platen 52.

The apparatus main body 2 includes a plurality of paper feeding cassettes 461, a paper feeding roller 462, and an image forming unit 40. The plurality of paper feeding cassettes 461 stores sheets of printing paper (an example of recording medium) of different sizes. The paper feeding roller 462 feeds the sheets of printing paper from the paper feeding cassettes 461 one by one and conveys them to the image forming unit 12. The image forming unit 40 forms an image on a sheet of printing paper fed from the paper feeding cassette 461.

The image forming unit 40 includes an image forming part 12 and a fixing part 45. The image forming part 12 performs an image forming operation for forming a toner image on the sheet of printing paper P fed from the paper feeding cassette 461, the feeding device (not illustrated), and the manual feeding tray 4. The image forming part 12 includes an intermediate transfer belt 125, image forming parts 12M, 12C, 12Y and 12B respectively corresponding to magenta, cyan, yellow and black, a driving roller 125a that drives the intermediate transfer belt 125 and a secondary transfer roller 41. The image forming parts 12M, 12C, 12Y and 12B are provided adjacent to the intermediate transfer belt 125.

Each of the image forming parts 12M, 12C, 12Y and 12B includes a photoreceptor drum 121, a developing device 122, a toner cartridge (not illustrated), a charging device 123, an exposure device 124, a primary transfer roller 126 and a drum cleaning device 127.

Upon execution of a printing job, a main controller 100 controls the image forming parts 12M, 12C, 12Y and 12B for each color to drive such that transferred toner images of magenta, cyan, yellow and black overlap with each other on a surface of the intermediate transfer belt 125. Accordingly, the main controller 100 forms a color toner image on the surface of the intermediate transfer belt 125, in other words performing intermediate transfer or primary transfer.

The secondary transfer roller 41 causes the color toner image formed on the surface of the intermediate transfer belt 125 to be transferred onto the sheet of printing paper P conveyed from a paper conveyance unit 411. The toner image transferred onto the sheet of printing paper P is fixed by the fixing part 45.

The paper conveyance unit 411 includes a paper path L1, a reverse paper path L2, and conveyance rollers 463, 464, and 465. When the conveyance rollers 463 and 464 provided at the paper path L1 are driven, the paper conveyance unit 411 conveys the sheet of printing paper P on which the toner image is fixed to a stack tray 49 or a discharging tray 48.

In a case in which the image forming unit 40 forms images on both faces of the sheet of printing paper and outputs it, the paper conveyance unit 441 switches back the sheet of printing paper, on one face of which an image has been formed, by reversing a pair of conveyance rollers 463 after the sheet of printing paper is nipped by the pair of conveyance rollers 463 located on a side closer to the discharging tray 48. The switched-back sheet of printing paper, which has been fed to the reverse paper path L2, is again conveyed upstream of the image forming unit 40. In this manner, an image is formed on the other face of the sheet of printing paper by the image forming unit 40.

Figure 2:
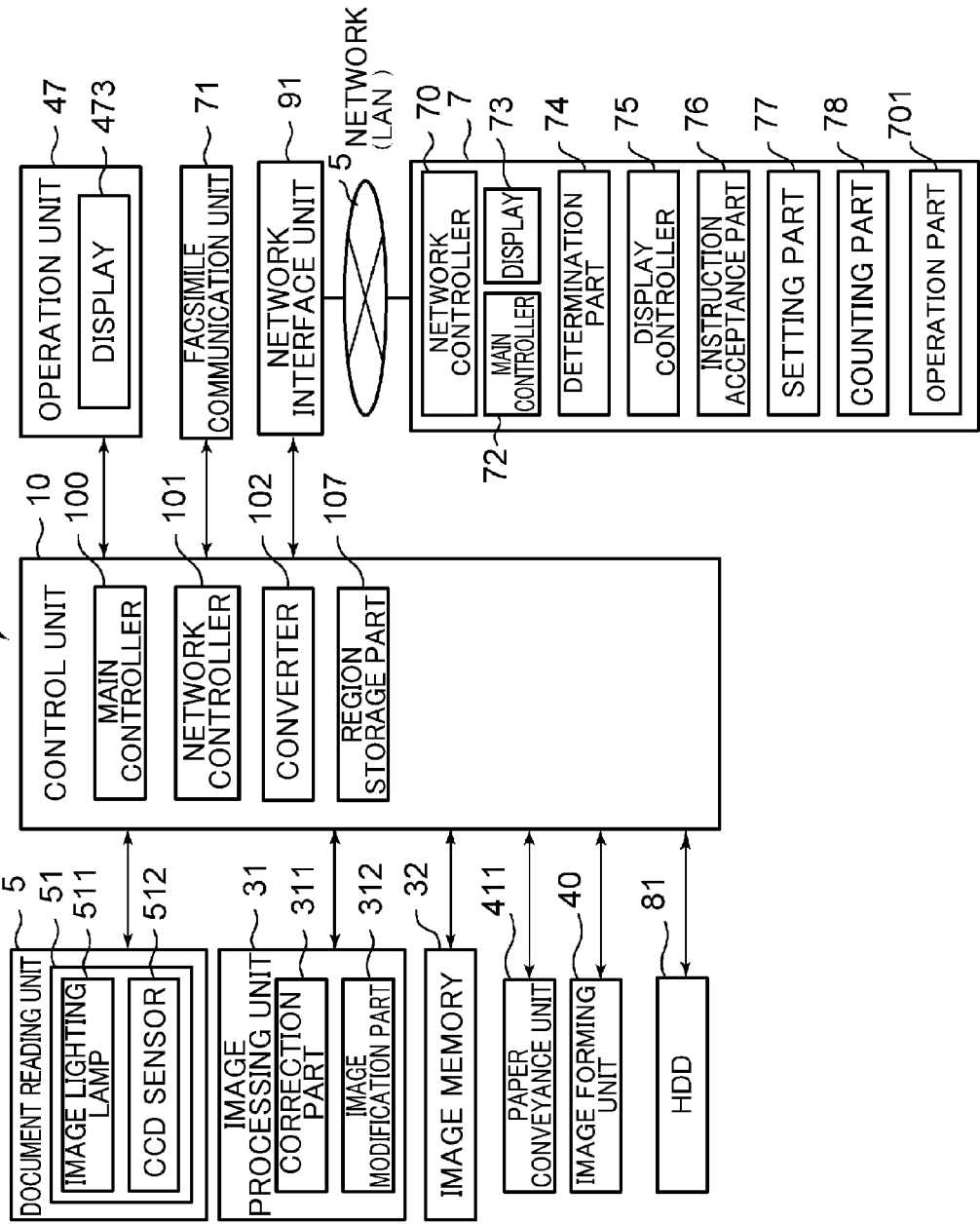
FIG. 2 is a functional block diagram schematically illustrating a main internal configuration of the multifunction peripheral.

A configuration of the multifunction peripheral 1 will be described hereinafter. FIG. 2 is a functional block diagram schematically illustrating a main internal configuration of the multifunction peripheral.

The multifunction peripheral 1 includes the control unit 10. The control unit 10 is composed of a Central Processing Unit (CPU), RAM, ROM, a dedicated hardware circuit and the like, and controls overall operation of the multifunction peripheral 1.

The control unit 10 is connected to the document reading unit 5, the image processing unit 31, the image forming unit 40, the operation unit 47, a facsimile communication unit 71, a Hard Disk Drive (HDD) 81, and a network interface unit 91.

The control unit 10 includes the main controller 100, a network controller 101, a converter 102, and a region storage part 107.

The main controller 100 controls overall operation of the abovementioned multifunction peripheral 1. The main controller 100 controls driving and processing of components required for operation and control of a scanning function, printing function, and copying function.

The network controller 101 controls network communication with an external device (for example, a client computer 7 and the like) via a LAN or internet. For example, the network controller 101 transmits through the network interface unit 91 data composed of a group of converted characters that have been converted by the converter 102 (described later).

The converter 102 compares respective portions of the image indicated by data read by the reading unit 5 with a plurality of preset reference patterns. The converter 102 converts a portion of the image to a character associated with a corresponding reference pattern by the Optical Character Reader (OCR) process. For example, the converter 102 stores in advance a plurality of patterns representing images corresponding to characters and symbols as the reference patterns described above. The converter 102 uses the reference patterns as templates and places the templates sequentially onto the respective portions of the image indicated by the data read by the document reading unit 5, determining whether there is a correspondence between the templates and the respective portions. The converter 102 searches the reference patterns and the portions of the image for a correlation between them at a pixel data level, so that it detects a portion of the image that is identical or similar to a template (also referred to as "pattern matching"). The converter 102 converts the portion of the image that is identical or similar to the template thus detected to a character associated with the template.

The region storage part 107 stores a bubble sheet region. The bubble sheet region is a region on the document that is subjected to a conversion process performed by the converter 102 and a determination process performed by a determination part 74. For example, when a user makes the document reading unit 5 read a sample document, which is a sample on which the marks are to be filled in, the image thus read is displayed on the display 473 controlled by the display controller 75. For example, when the user specifies two points on a screen of the display 473 displaying an image of the document, the touch screen function of the display 473 enters a rectangular region, which diagonal line is a straight line connecting the two points, as the bubble sheet region in the operation unit 47. The bubble sheet region thus input is stored in the region storage part 107.

The region storage part 107 may be required only when it is necessary in embodiments of a mark detection process (described later).

The scanner 51 of the document reading unit 5 includes an image lighting lamp 511 and a CCD sensor 512. The scanner 51 casts light on the document by the image lighting lamp 511. The CCD sensor 512 receives the reflected light that is emitted to the document by the image lighting lamp 511. In this manner, the scanner 51 reads an image from the document.

The image processing unit 31 processes the image data read by the document reading unit 5 when processing is necessary. For example, the image processing unit 31 performs a preset image process in order to improve quality of the image that is read by the document reading unit 5 and subjected to image formation performed by the image forming unit 40. The image processing unit 31 includes a correction part 311 and an image modification part 312. The correction part 311 adjusts values, as image output process data of the image forming unit 40, such as, output voltage of the charging device 123, an amount of exposure light of the exposure device 124, a developing bias voltage of the developing device 122, a transfer bias of the primary transfer roller 126, a transfer bias of the secondary transfer roller 41 and the like. The image modification part 312 performs a correction process on the image data read by the document reading unit 5, such as level correction, gamma correction and the like. The image modification part 312 performs a modification process on the image data, such as compression/extension process, enlargement/reduction process and the like. The image data processed by the image processing unit 31 is stored in an image memory 32. In addition, the image data processed by the image processing unit 31 is output to the image forming unit 40, the facsimile communication unit 71 or the like.

The image memory 32 stores the image data read by the document reading unit 5 and the like.

The paper conveyance unit 411 is composed of, as shown in FIG. 1, the paper feeding cassette 461, the paper feeding roller 462, the conveyance rollers 463, 464, 465, and the like. The paper conveyance unit 411 conveys sheets of printing paper stored in the paper feeding cassette 461 to the image forming unit 40 and the discharging tray 48.

The image forming unit 40 includes, as described above, image forming parts 12M, 12C, 12Y and 12B, the intermediate transfer belt 125 stretched around the driving roller 125a, and the secondary transfer roller 41. The image data subjected to image formation performed by the image forming unit 40 are the image data read by the document reading unit 5, image data transferred from the client computer 7 within a local area via the LAN and the network interface unit 91 and the like.

The operation unit 47 includes the display 473 and the like. The operation unit 47 accepts instructions relating to the multifunction peripheral 1 from the user, by way of the touch panel function of the display 473 and the above-described operation keys.

The facsimile communication unit 71 includes an encoding part, a decoding part, a modulation/demodulation part, and a Network Control Unit (NCU), which are not illustrated. The facsimile communication unit 71 transmits facsimile via a public telephone network. The facsimile communication unit 71 transmits the image data of the document read by the document reading unit 5 to a facsimile device and the like, and receives image data transmitted by a facsimile device and the like via a telephone line.

The Hard Disk Drive (HDD) 81 stores the image data read by the document reading unit 5, various data such as an output format set to the image data, and the like. The image data stored in the HDD 81 is used by the multifunction peripheral 1 and various programs employed therein.

The network interface unit 91 is composed of communication modules such as a LAN board. The network interface unit 91 transmits to and receives from the client computer 7 and the like various data via the LAN 5 and the like connected to the network interface unit 91. For example, the network interface unit 91 transmits data composed of a group of characters having been converted by the converter 102 to the client computer 7, via the network interface unit 91, the LAN 5, and the like.

The client computer 7 includes a network controller 70, main controller 72, display 73, determination part 74, display controller 75, instruction acceptance part 76, setting part 77 and counting part 78. The control unit may function as the network controller 70, the main controller 72, the display 73, the determination part 74, the display controller 75, the instruction acceptance part 76, the setting part 77, and the counting part 78. The control unit is provided in the client computer 7 and is composed of, a CPU, RAM, ROM, a dedicated hardware circuit, and the like.

The network controller 70, the main controller 72, the display 73, the determination part 74, the display controller 75, the instruction acceptance part 76, the setting part 77, and the counting part 78 may be separately composed of circuits, respectively.

The network controller 70 controls data communication via a network. The main controller 72 controls overall operation of the client computer 7.

The client computer 7 is an exemplary embodiment of a computer constituting a part of the mark detection apparatus.

For example, the determination part 74 stores in advance the following plurality of characters including a shape of a black square and shapes similar to the black square as first reference characters among characters converted by the converter 102.

「固」、「圃」、「此」、「弐」、
「■」、「啣」、「階」、「圏」

The determination part 74 determines whether the post-conversion character converted by the converter 102 of the multifunction peripheral 1 coincides with any of the preset first reference characters. If the post-conversion character coincides with a first reference character, the determination part 74 determines that a portion of the image is a mark, which is in the data read by the document reading unit 5 of the multifunction peripheral 1 and determined to correspond to the character. If the post-conversion character does not coincide with a first reference character, the determination part 74 determines that the portion of the image is not a mark. The mark is a symbol entered by a person, for example by filling in with a writing tool, at a predetermined position printed on the document. For example, the mark is a symbol and the like entered by a person using a writing tool at a predetermined position on a bubble sheet for a case where the document is entirely or partially the bubble sheet.

The display controller 75 causes the character converted by the converter 102 and a result of mark detection performed by the determination part 74 for this converted character to be displayed on the display 73.

The instruction acceptance part 76 accepts a character setting instruction relating to the character displayed on the display 73 from the user through the display controller 75. The character setting instruction represents an instruction for determining whether the character displayed on the display 73 through the display controller 75 is set as a first reference character, for example. The character setting instruction is input by operation performed by the user on the operation part 701. The character setting instruction thus input is accepted by the instruction acceptance part 76. The operation part 701 includes a keyboard, a mouse pointer, and the like provided at the client computer 7.

The setting part 77 performs one of: setting the character displayed on the display 73 as the first reference character; and excluding the character displayed on the display 73 from the first reference character, according to the character setting instruction accepted by the instruction acceptance part 76. In other words, the setting part 77 sets the character displayed on the display 73 as the first reference character for a case where the character setting instruction accepted by the instruction acceptance part 76 instructs to set the character displayed on the display 73 as the first reference character. In addition, the setting part 77 excludes the character displayed on the display 73 from the first reference character for a case where the character setting instruction accepted by the instruction acceptance part 76 instructs to exclude the character displayed on the display 73 from the first reference character.

The counting part 78 counts results of determination performed by the determination part 74 as to whether each portion of the image indicated by the data read by the document reading unit 5 is mark or not.

It should be noted that the instruction acceptance part 76, the display controller 75, and the setting part 77 are required only when they are necessary in embodiments of mark detection process as will be described later.

Figure 3:
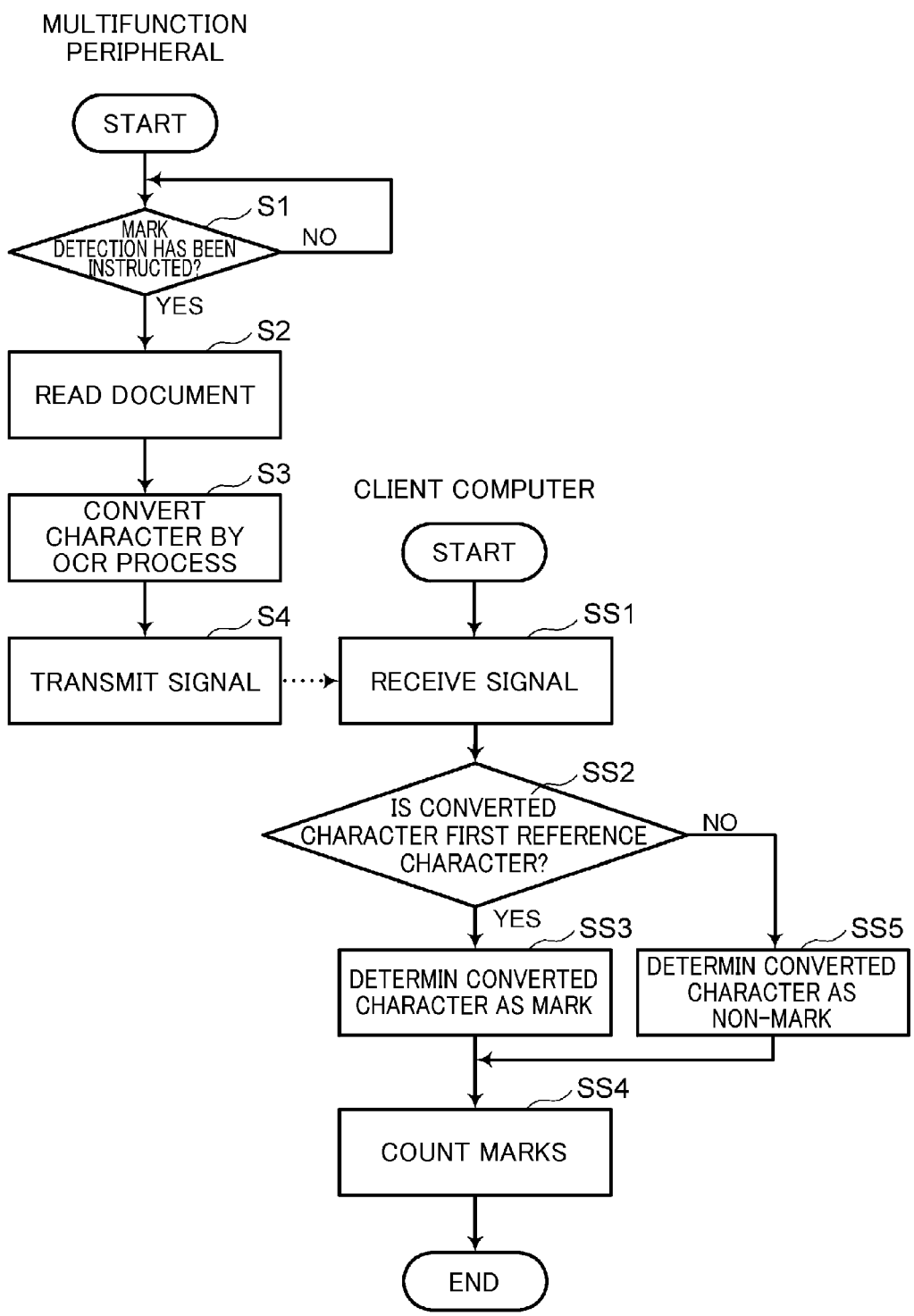
FIG. 3 is a flow chart showing a first embodiment of a mark detection process performed by the mark detection apparatus.
Figure 4:
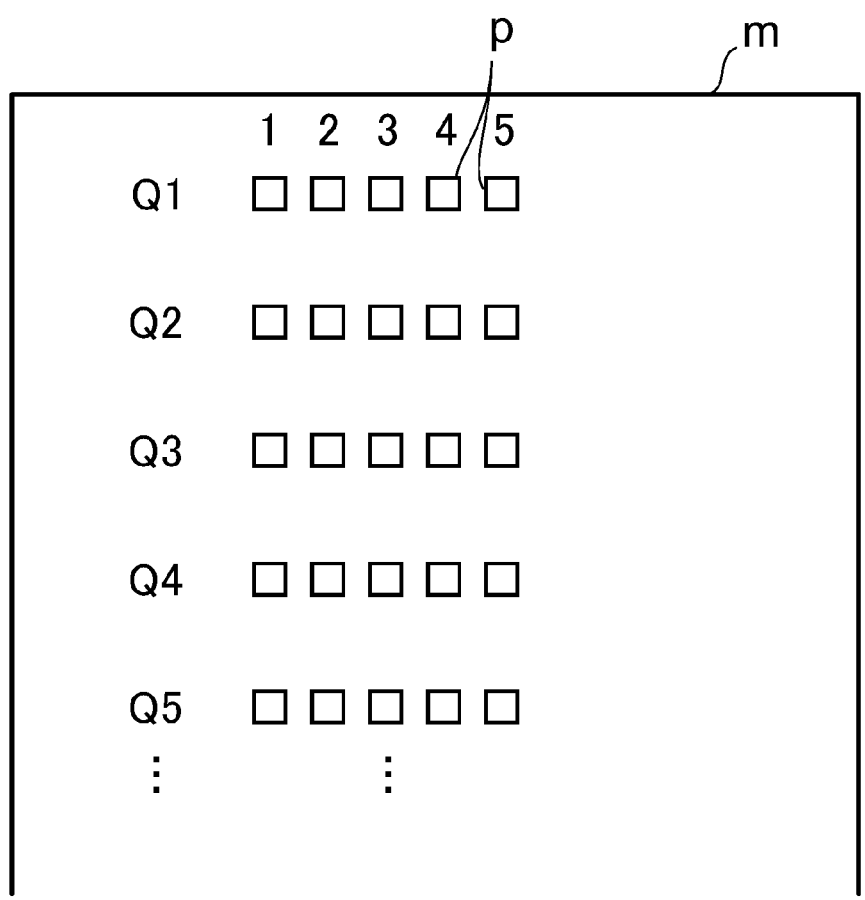
FIG. 4 is a diagram illustrating an example of a front face of a document.
Figure 5A:
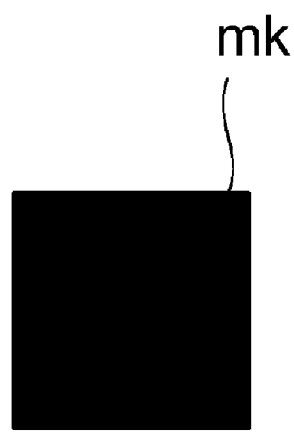
FIG. 5A is a diagram illustrating an example of an image of a mark filled in a guide frame printed on the document.
Figure 5B:
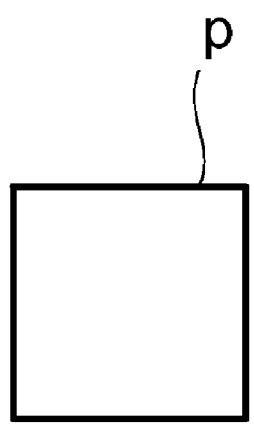
FIG. 5B is a diagram illustrating an example of an image of the guide frame printed on the document.
Figure 6:
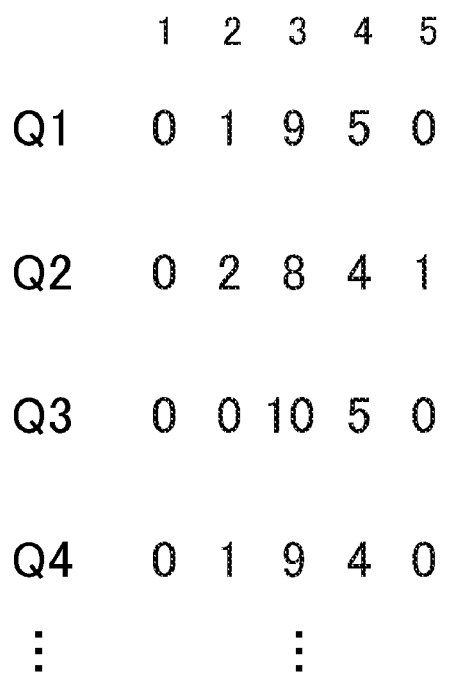

A first embodiment of a mark detection process performed by the mark detection apparatus will be described hereinafter. FIG. 3 is a flow chart showing the first embodiment of a mark detection process performed by the mark detection apparatus. FIG. 4 is a diagram illustrating an example of a front face of a document. FIG. 5A is a diagram illustrating an example of an image of a mark filled in a guide frame printed on the document. FIG. 5B is a diagram illustrating an example of an image of the guide frame printed on the document. FIG. 6 is a diagram illustrating an example of counting data. FIG. 7A is a diagram virtually illustrating a group of characters converted by the converter. FIG. 7B is a diagram showing an example of an equation. FIG. 7C is a diagram showing an example of a column of counted values.

As shown in FIG. 3, a mark detection instruction is input to the operation unit 47 through a user's operation performed on the operation unit 47 (YES in Step S1). The mark detection instruction requests the execution of a mark detection process. With the mark detection process, an image is detected, which has a shape of a preset mark, among images indicated by the data read by the document reading unit 5. In this connection, the main controller 100 causes the document reading unit 5 to read an image of a document placed on the document mount 61, the platen 52 or the like (Step S2). Alternatively, the mark detection instruction may be conveyed through the processes below. The mark detection instruction is input by a user's operation performed on the operation part 701 of the client computer 7. The network controller 70 outputs the mark detection instruction to the multifunction peripheral 1. The network controller 101 of the multifunction peripheral 1 receives the mark detection instruction. Subsequently, the main controller 100 causes the document reading unit 5 to read a document.

In Step S2, a square shaped guide frame p is printed on a document m to be read, for example as shown in FIG. 4. The guide frame p on the document m to be read indicates a position at which a user fills in a mark. A region surrounded by the guide frame p filled in by the user with a writing tool becomes the mark on the document m. The document reading unit 5 reads an image of the guide frame p and an image of the mark filled in the guide frame p.

Next, the converter 102 performs character conversion by the above-described Optical Character Reader (OCR) process for respective portions of the image indicated by the data read by the document reading unit 5 (Step S3). As described above, the converter 102 performs a conversion process to a character using the OCR process for the respective portions of the image indicated by the data read by the document reading unit 5. In the OCR process, a reference pattern is used as a template. Here, the image indicated by the data includes an image of the guide frame p and an image of the mark filled in the guide frame p. Accordingly, the converter 102 converts the image of the guide frame p and the image of the mark to characters.

Here, a mark mk as an example is shown in FIG. 5A, which is an image of a black square in which the square shape of the guide frame p is completely blacked out or an image similar to it.

Accordingly, the mark mk is converted into the following characters and the like that are similar in shape to the image of a black square or an image similar to it, by the OCR process performed by the converter 102.

「固」、「囿」、「此」、「 ᄀ」、
「■」、「嘲」、「階」、「圈」

On the other hand, the guide frame p without a mark filled in by the user, which is white inside, is shown in FIG. 5B, for example. Accordingly, the guide frame p is converted into the following characters and the like that are similar in shape to the image of a square that is white inside or an image similar to it, by the OCR process performed by the converter 102.

「□」、「ロ」、「u」、「ロ」「□」、「凵」、「凵」、「凵」

Thereafter, the network controller 101 transmits data composed of a converted group of characters, which have been converted by the converter 102 in Step S3, via the network interface unit 91 to a computer such as the client computer 7, which performs counting to be described later (Step S4).

In the client computer 7, the network controller 70 receives the data composed of the converted group of characters via a network interface unit (not illustrated) (Step SS1). The determination part 74 determines whether a converted character coincides with a first reference character or not (Step SS2). If the converted character coincides with the first reference character (YES in Step SS2), the determination part 74 determines that a portion of the image corresponding to the character is a mark mk filled in by the user, the image being indicated by the data read by the document reading unit 5 (Step SS3). If the converted character does not coincide with the first reference character (NO in Step SS2), the determination part 74 determines that the portion of the image corresponding to the character is not a mark mk filled in by the user, the image being indicated by the data read by the document reading unit 5 (Step SS5).

The conversion performed by the converter 102 is conversion simply using an OCR process for the read image data of the document. On the other hand, the determination part 74 determines to which character the character converted by the OCR process belongs, between a character converted from an image representing the mark mk filled in and a character converted from an image representing the guide frame p white inside.

For example, as the first reference characters, the following characters and the like that are similar in shape to the image of a black square indicating the mark mk filled in or an image similar to it are selected.

「固」、「囿」、「此」、「 ᄀ」、
「■」、「嘲」、「階」、「圈」

The plurality of characters selected is stored in the determination part 74 in advance as the first reference characters. The image indicating the guide frame p without the mark that is white inside is supposed to be converted to the following characters and the like that are similar to the image of a square white inside.

「凵」、「ロ」、「u」、「ロ」「□」、「□」、「凵」、「凵」

Accordingly, it may be preferable that the characters similar to an image of a square white inside are excluded from the first reference characters to be stored.

As a result, when an image on the document is read by the document reading unit 5 and converted by the converter 102 into any of the characters, the determination part 74 determines that the image thus read is a mark mk if the image read corresponds to a first reference character. Therefore, it is possible that the presence of a mark mk on a document is correctly detected.

When the above-described character conversion and determination are completed for all portions of the image indicated by the data read on the document (all documents in a case of a plurality of documents) by the document reading unit 5, counting is preformed by the counting part 78 (Step SS4). A series of processes as the mark detection process is completed (END).

For example, five guide frames p are printed for a question on the document m, as shown in FIG. 4. When a user fills in one of five guide frames p with a mark mk, the counting part 78 generates counting data shown in FIG. 6, for example. In this case, the counting part 78 calculates the number of marks mk filled in the first to fifth guide frames p for respective questions (Q1, Q2, Q3 . . . in FIG. 4) on a plurality of documents, using the determination result for each document acquired by the determination part 74.

For such counting, the counting part 78 calculates the number of the marks mk for the respective questions (Q1, Q2, Q3, . . . in FIG. 4) on the plurality of documents and generates the counting data shown in FIG. 6, based on the information related to the determination result identifying a mark mk or non-mark obtained by the determination part for each document 74, and the information indicating positions of marks mk or guide frames p corresponding to the determination result. For example, suppose that timing marks (not illustrated) are printed in the vicinity of the questions (Q1, Q2, Q3 . . . in FIG. 4) on the document used as a bubble sheet, with black ink or the like. In this case, the converter 102 detects an image of the timing mark (not illustrated) from the image indicated by the data read from each of the documents, when the converter 102 performs character conversion for respective portions of the image indicated by the data read from each of the documents. And then, the converter 102 obtains the position information related to the mark mk or the guide frame p for each question, based on the detected timing mark. The converter 102 detects the timing mark similarly to the above-described pattern matching, for example.

According to the mark detection process by the multifunction peripheral 1, it is possible that the mark detection on a document such as a bubble sheet is performed by using a reading device capable of an OCR process provided in an image forming apparatus and the like, without purchasing a special apparatus capable of an OMR process. As a result, it is possible that the mark detection is performed with a precision by using an image forming apparatus generally provided in a working environment such as companies and offices. In addition, it is possible to perform the mark detection with a reduced cost by using the image forming apparatus and the like, since it is not necessary to purchase an OMR device.

In the present disclosure, the determination of mark or non-mark is performed based on the converted character, which is obtained after the character conversion performed through the OCR process. Accordingly, it is possible for the mark detection with the character conversion to increase the accuracy of mark detection more than the direct mark detection based on the shape of image indicated by the read data. With the direct mark detection based on the shape of image indicated by the read data, there is possibly a risk of misreading a smudge as an image and a risk of less accurate mark detection due to partial missing of an image to be read. However, in the present disclosure, the mark determination is performed based on the character converted through the OCR process. As a result, it is possible to prevent a reduction in accuracy of mark detection, even if there is a change in reading ability of the reading unit.

In this connection, the determination part 74 stores the following characters and the like that are similar in shape to the image of a black square indicating the mark mk or an image similar to it as the first reference characters.

「固」、「囲」、 囮」、「弖」、
「■」、「嚁」、「階」、「圏」

When the character converted by the converter 102 coincides with a first reference character, the determination part 74 determines that the portion of an image corresponding to the character is the mark mk, the image being indicated by the data read by the document reading unit 5. Alternatively, it may be possible that the determination part 74 defines characters not falling under a group of preset characters similar to a square white inside as the first reference characters and uses these characters for the mark determination.

「凵」、「U」、「u」、「ロ」、「ロ」、「口」、「凵」

In this case, it may be possible to use a configuration as described below in addition to the above-described configuration for counting the counting data. For example, when the network controller 70 receives the group of characters indicated by the data converted by the converter 102, the determination part 74 divides the data representing the group of characters with respect to each question and aligns the data for each document (see FIG. 7A). The determination part 74 and the counting part 78 calculate the column of counted values shown in FIG. 7C using an equation composed of functions. In this case, the determination part 74 uses, for example, an equation of sequentially determining for the first to fifth guide frames p for each question on each document, whether the character does not fall under the following group of characters that are similar to an image of a square white inside.

「凵」、「U」、「u」、「ロ」、「ロ」、「凵」、「凵」

Subsequently, the determination part 74 detects a position of a guide frame p for which a noteworthy character has been detected and uses an equation which provides a result including the information related to which position the guide frame p occupies. An example of the equation is shown in FIG. 7B. The counting part 78 divides the determination result provided by the determination part 74 indicating the position of the guide frame p for which the noteworthy character has been detected for each question, and generates columns of counted values in which the results are aligned for each document (FIG. 7).

Next, a process for updating the first reference character will be described. FIG. 8 is a flow chart showing a process for updating a first reference character;

FIG. 9 is a diagram illustrating an example of a screen of the display 73 in the client computer 7.

As shown in FIG. 8, when a user operates on the operation part 701 of the client computer 7, an instruction for displaying the determination result of the mark detection performed by the determination part 74 is input to the operation part 701 (YES in Step SS11). In this case, as shown in FIG. 9, the display controller 75 reads from memory and the like provided in the determination part 74, and causes the display 73 to display characters as the determination result performed by the determination part 74 at this moment, and the determination result of mark detection for the characters (Step SS12).

When an instruction for setting the character displayed on the display 73 as the first reference character has been input to the operation part 701 ("Setting Instruction" in Step SS13) by the user who operates on the operation part 701, the setting part 77 performs setting for addition of the character to the group of characters stored in the determination part 74 as the first reference characters (Step SS14). The operation by the user on the operation part 701 is performed by, for example, specifying a desired character and then pressing a button B1 "Setting as First Reference Character" in FIG. 9, using a mouse pointer or the like.

On the other hand, when a desired character has been specified and then an instruction for excluding the character displayed on the display 73 from the first reference character has been input to the operation part 701 ("Exclusion Instruction" in Step SS13) by the user who operates the mouse pointer or the like, the setting part 77 deletes the character from the group of characters stored in the determination part 74 as the first reference characters (Step SS15).

As a result, for example, it is possible for the user to increase the accuracy of mark detection performed by the determination part 74, based on the converted character displayed on the display 73 and the determination result of mark detection. More specifically, a user makes an instruction on whether the displayed character should be the first reference character or not, if the user recognizes that the determination part 74 incorrectly determines a mark as a non-mark even though the mark exists on the document (for example due to the mark being in an unexpected shape on the document), or the determination part 74 determines that there is a mark even though there is no mark on the document. In this manner, it is possible to increase the accuracy of mark detection performed by the determination part 74.

Figure 10:
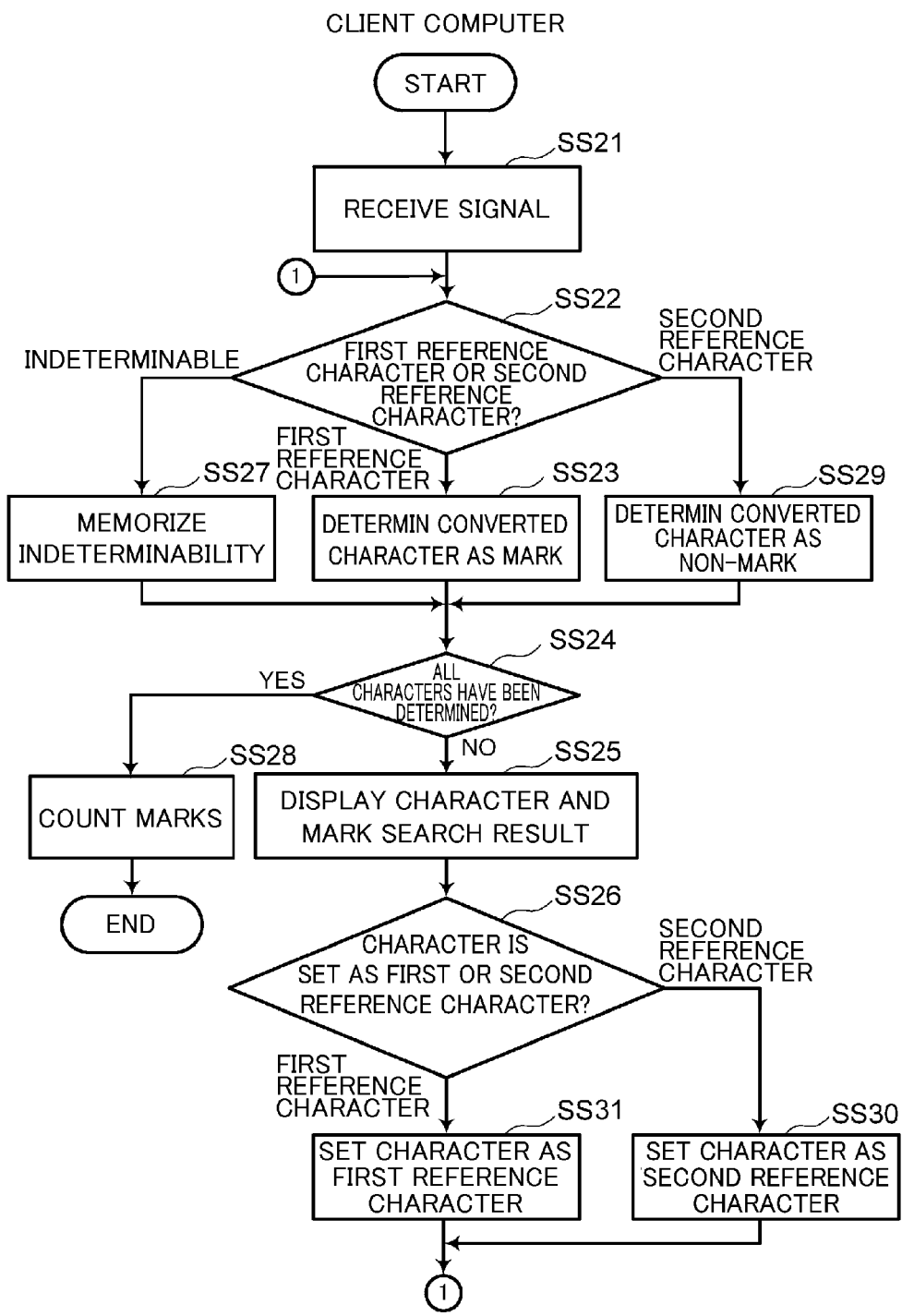
FIG. 10 is a flow chart showing a second embodiment of a mark detection process performed by a mark detection apparatus.
Figure 11:
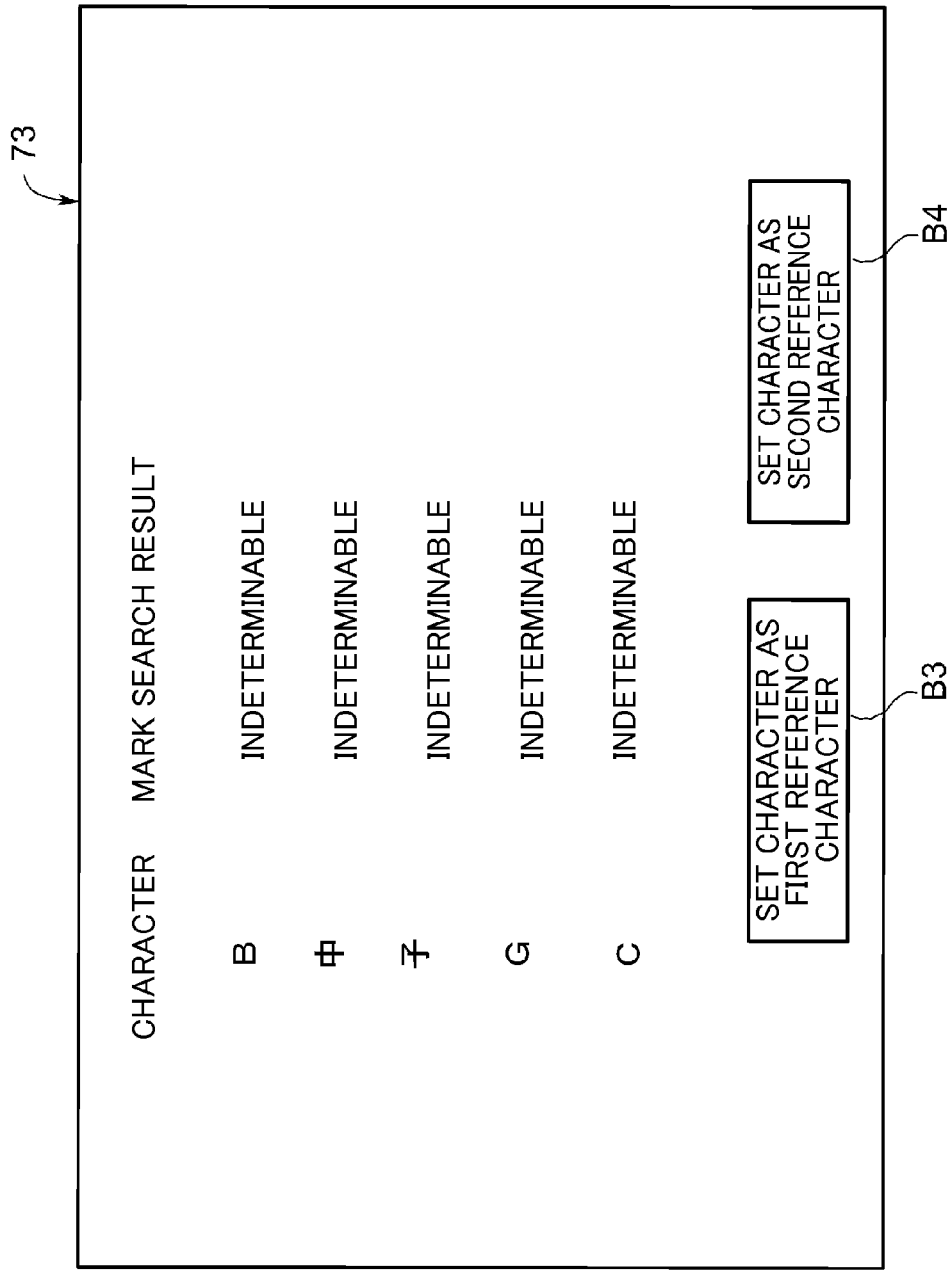
FIG. 11 is a diagram illustrating an example of a screen of a display in a client computer.

Next, a second embodiment of a mark detection process by a mark detection apparatus will be described hereinafter. FIG. 10 is a flow chart showing a second embodiment of a mark detection process by the mark detection apparatus. FIG. 11 is a diagram illustrating an example of a screen of a display 73 in a client computer 7. Description will not be repeated for the same processes as the first embodiment. In addition, since the processes performed by a multifunction peripheral 1 are the same as those in the first embodiment, the illustration of the processes performed by the multifunction peripheral 1 is omitted in FIG. 10.

In the second embodiment, a determination part 74 of the client computer 7 stores in advance a second reference characters for determination of an image that is not a mark in addition to a first reference characters for determination of the mark. Examples of the first reference characters are the following characters and the like to which an image of a black square and an image similar to it are likely to be converted by a converter 102.

「固」、「囲」、 囮」、「弖」、
「■」、「嚁」、「階」、「圏」

Examples of the second reference characters are the following characters and the like to which an image of a square white inside and an image similar to it are likely to be converted by the converter 102.

「固」、「冊」、「比」、「弖」、
「■」、「嚁」、「階」、「圏」

The determination part 74 determines to which of a first reference character, a second reference character, or a character that coincides with neither the first reference character nor the second reference character the character corresponds, which is converted by the converter 102 of the multifunction peripheral 1 (Step SS22).

If the converted character coincides with a first reference character (when the character is determined to be "First Reference Character" in Step SS22), the determination part 74 determines that the image portion corresponding to the converted character (a portion of an image indicated by the data read by a document reading unit 5) is a mark (Step SS23). On the other hand, if the converted character coincides with a second reference character (when the character is determined to be "Second Reference Character" in Step SS22), the determination part 74 determines that the image portion corresponding to the converted character is not a mark (Step SS29).

In addition, if the determination part 74 determines that the converted character is neither the first reference character nor the second reference character (when the character is determined to be "Indeterminable" in Step SS22), the determination part 74 memorizes the indeterminability of the converted character (Step SS27).

Here, the determination part 74 determines whether the determination process has been completed for all characters that are converted by the converter 102 (Step SS24). If the determination process has been completed for all converted characters (YES in Step SS24), the counting part 78 performs counting as in the first embodiment (Step SS28). Subsequently, a series of processes as the mark detection process is completed (END).

On the other hand, if there is a converted character for which the determination process has not been completed (NO in Step SS24), a display controller 75 causes a display 73 to display the character, which is neither the first reference character nor the second reference character (indeterminable), as shown in FIG. 11 (Step SS25).

When an instruction for setting the character displayed on the display 73 as a first reference character has been input to the operation part 701 ("First Reference Character" in Step SS26) by the user who operates on the operation part 701, a setting part 77 performs setting for addition of the character to the group of characters stored in the determination part 74 as the first reference characters (Step SS31). The operation by the user on the operation part 701 is performed by, for example, specifying a desired character and then pressing a button B3 "Setting as First Reference Character" in FIG. 11, using a mouse pointer or the like.

On the other hand, when an instruction for setting the character displayed on the display 73 as a second reference character has been input to the operation part 701 ("Second Reference Character" in Step SS26) by the user who operates on the operation part 701, the setting part 77 performs setting for addition of the character to the group of characters stored in the determination part 74 as the second reference characters (Step SS30). The operation by the user on the operation part 701 is performed by, for example, specifying a desired character and then pressing a button B4 "Setting as Second Reference Character" in FIG. 11, using a mouse pointer or the like.

Thereafter, the process returns to Step SS22. However, in Step SS22 after Steps SS26, SS30 and SS31, the determination part 74 determines prior to processes in Steps SS30 and SS31 whether the character that has been displayed is the first reference character, the second reference character or a character that is neither the first reference character nor the second reference character.

Accordingly, even if the image indicated by the data read by the document reading unit 5 has been converted into a character that is neither the first reference character nor the second reference character by the converter 102, the character is set as the first reference character or the second reference character according to the character setting instruction given by the user. In this manner, even if the mark on the document is not in an expected shape, and an image data generated from this shape is converted by the converter 102 into an unexpected character which is neither a first reference character nor a second reference character, it may be possible for the user to set the unexpected character as the first reference character or the second reference character. Accordingly, it may be that the mark is more accurately determined by the determination part 74. As a result, it may be possible to increase the accuracy, associated with image reading on the document and determination of mark in detection of the mark on the document by the OCR process.

Figure 12:
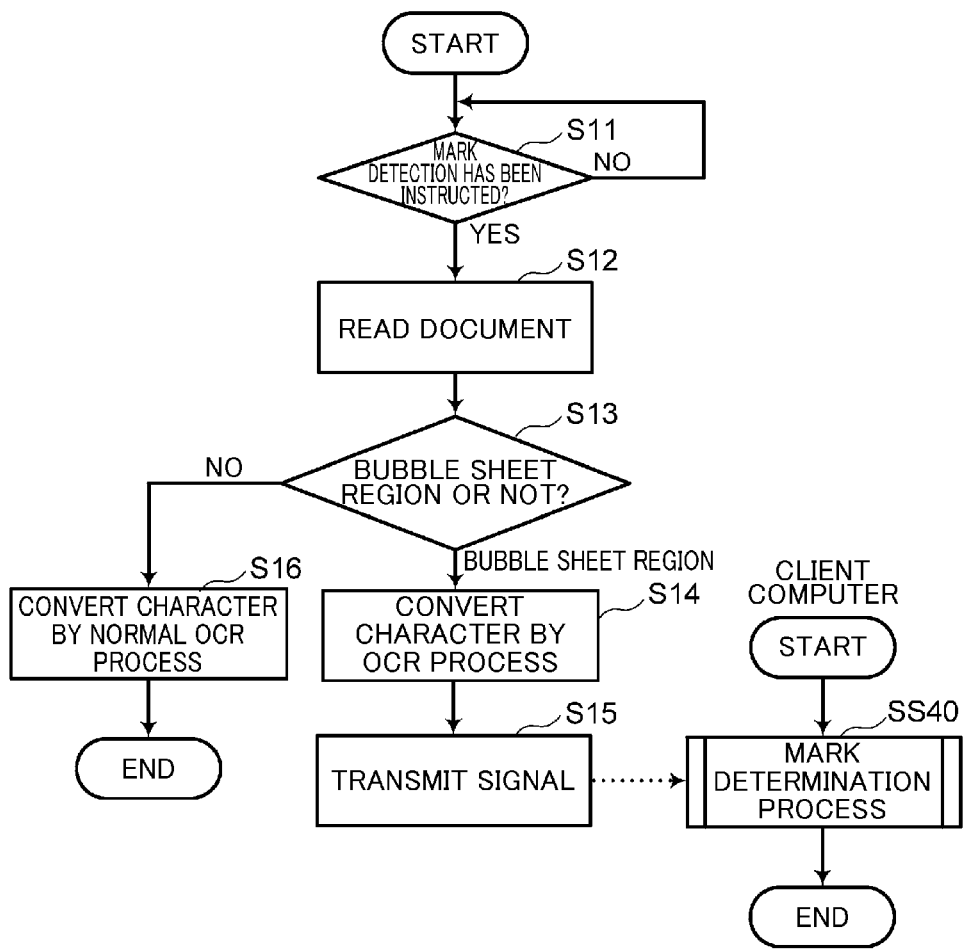
FIG. 12 is a flow chart showing a third embodiment of a mark detection process performed by a mark detection apparatus.

Next, a third embodiment of a mark detection process by a mark detection apparatus will be described hereinafter. FIG. 12 is a flow chart showing the third embodiment of the mark detection process performed by the mark detection apparatus. Description will not be repeated for the same processes as the first and second embodiments.

Processes in Steps S11 and S12 of the third embodiment are the same as the processes in Steps S1 and S2 of the first embodiment.

In the third embodiment, as shown in FIG. 12, a converter 102 of a multifunction peripheral 1 determines before a conversion process whether a region of data read by a document reading unit 5 is a bubble sheet region or not, according to the information related to the bubble sheet stored in a region storage part 107 (Step S3).

For the region determined not to be the bubble sheet region ("Not Bubble Sheet Region" in Step S13), the converter 102 performs only an OCR process for the region in the data read by the document reading unit 5 (Step S16), and terminates the process. With the conversion result in Step S16, the converted data using the OCR process is not transmitted to a client computer 7. Accordingly, the conversion result in Step S16 is not subjected to a mark determination process and a counting process in the client computer 7.

On the other hand, for the region determined to be the bubble sheet region ("Bubble Sheet Region" in Step S13), the converter 102 performs the OCR process for respective portions of the image indicated by the data read by the document reading unit 5 (Step S14), as in the first and second embodiments. Subsequently, a network controller 101 transmits post-conversion data composed of the converted characters to the client computer 7 (Step S15). And then, in the client computer 7, the determination process and the counting process are performed as in the first and second embodiments (Step SS40). A series of processes as the mark detection process is completed (END).

As a result, even in a case in which both a mark to be detected by the mark detection process and an image to be processed by the character conversion by a normal OCR process are present on a document, it may be possible to appropriately process the mark by the conversion process and the determination process, and to appropriately process the image only by the character conversion using the OCR process.

It should be noted that the present disclosure is not limited to the above-described embodiments and can be carried out in various modes. For example, in the above embodiments, the mark detection apparatus according to an embodiment of the present disclosure has been described to include a part of components of the multifunction peripheral 1 as an image reading device and a part of components of the client computer 7. However, the mark detection apparatus according to the present disclosure is not limited thereto. It may alternatively be possible that a device to read an image of a document such as a scanner device is adopted as the image reading device described above, for example.

In addition, in the above embodiments, the mark detection apparatus has been described to include a part of components of the multifunction peripheral and a part of components of the client computer 7. However, it may alternatively be possible that the multifunction peripheral 1 has the part of the components of the client computer 7, such that the mark detection apparatus is configured only with an image forming apparatus such as the multifunction peripheral 1.

It should be noted that the configuration and process described in the above embodiments with reference to FIGS. 1 to 12 are merely embodiments of the present disclosure and in no way restrict the present disclosure to the configuration and process.

The mark detection method of the present disclosure is not limited to a mode using the mark detection apparatus.

The invention claimed is:

1. A mark detection apparatus, further comprising:
a reading unit configured to read an image on a document;
a converter configured to compare respective portions of the image read by the reading unit with a plurality of preset reference patterns and convert a portion of the image to a character associated with a corresponding reference pattern;
a determination part configured to determine that the portion of the image to have been compared on the document is a mark in a case in which the character converted by the converter is a preset first reference character, and that the portion of the image to have been compared on the document is not a mark in a case in which the character converted by the converter is not the preset first reference character;
a display;
a display controller configured to cause the display to display the character converted by the converter and a result of mark detection performed by the determination part with respect to the converted character;
an instruction acceptance part configured to accept a character setting instruction representing whether the character displayed on the display is set to be the first reference character; and
a setting part configured to perform one of:
setting the character displayed on the display as the first reference character; and
excluding the character displayed on the display from the first reference character, according to the character setting instruction accepted by the instruction acceptance part, wherein the converter comprises a process with an optical character reader,
wherein the determination part is configured to determine that the portion of the image read by the reading unit is a mark in a case in which the converted character converted by the converter coincides with the first reference character, and that the portion of the image read by the reading unit is not a mark in a case in which the converted character converted by the converter coincides a preset second reference character that is different from the first reference character,
the display controller is configured to cause the display to display the converted character for which the determination part determines that a mark is indeterminable,
the instruction acceptance part is configured to accept the character setting instruction instructing to which of the first reference character and the second reference character the character displayed on the display is assigned, and
the setting part is configured to set the character displayed on the display as the first reference character or the second reference character, according to the character setting instruction accepted by the instruction acceptance part.

2. A mark detection apparatus comprising:
a reading unit configured to read an image on a document;
a converter configured to compare respective portions of the image read by the reading unit with a plurality of preset reference patterns and convert a portion of the image to a character associated with a corresponding reference pattern;
a determination part configured to determine that the portion of the image to have been compared on the document is a mark in a case in which the character converted by the converter is a preset first reference character, and that the portion of the image to have been compared on the document is not a mark in a case in which the character converted by the converter is not the preset first reference character; and
a region storage part configured to store a bubble sheet region, which is a region on the document that is subjected to a conversion process performed by the converter and a determination process performed by the determination part,
wherein the converter comprises a process with an optical character reader, and
wherein the converter performs the conversion process and the determination part performs the determination process with respect to data in the bubble sheet region that is read by the reading unit and stored in the region storage part, and
wherein the determination part is configured to determine that the portion of the image read by the reading unit is a mark in a case in which the converted character converted by the converter coincides with the first reference character, and that the portion of the image read by the reading unit is not a mark in a case in which the converted character converted by the converter coincides a preset second reference character that is different from the first reference character,
the display controller is configured to cause the display to display the converted character for which the determination part determines that a mark is indeterminable,
the instruction acceptance part is configured to accept the character setting instruction instructing to which of the first reference character and the second reference character the character displayed on the display is assigned, and
the setting part is configured to set the character displayed on the display as the first reference character or the second reference character, according to the character setting instruction accepted by the instruction acceptance part.

* * * * *